(12) United States Patent
Huh et al.

(10) Patent No.: US 12,228,748 B1
(45) Date of Patent: Feb. 18, 2025

(54) DISPLAY DEVICE AND METHOD OF MANUFACTURING THE SAME

(71) Applicant: SAMSUNG DISPLAY CO., LTD., Yongin-si (KR)

(72) Inventors: Su Jung Huh, Yongin-si (KR); Jeong Woo Park, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/739,447

(22) Filed: Jun. 11, 2024

(30) Foreign Application Priority Data

Aug. 16, 2023 (KR) .................. 10-2023-0106656

(51) Int. Cl.
*G02B 30/27* (2020.01)
*G02F 1/1335* (2006.01)
*G02F 1/1337* (2006.01)

(52) U.S. Cl.
CPC ....... *G02B 30/27* (2020.01); *G02F 1/133528* (2013.01); *G02F 1/133784* (2013.01)

(58) Field of Classification Search
None
See application file for complete search history.

(56) References Cited

U.S. PATENT DOCUMENTS

2008/0013002 A1 1/2008 Hong et al.
2012/0320288 A1* 12/2012 Baek .................. G02B 30/27
349/200

FOREIGN PATENT DOCUMENTS

| CN | 104020625 | 9/2014 |
| KR | 10-0784080 | 12/2007 |
| KR | 10-2008-0086756 | 9/2008 |
| KR | 10-1324398 | 10/2013 |
| KR | 10-1327837 | 11/2013 |

* cited by examiner

*Primary Examiner* — Phu Vu
(74) *Attorney, Agent, or Firm* — F. Chau & Associates, LLC

(57) ABSTRACT

A display device includes a display panel including pixels, a polarization layer disposed on the display panel and configured to polarize light in a first polarization direction, a liquid crystal layer disposed on the polarization layer and including liquid crystal molecules, a lens array disposed on the liquid crystal layer and including lenses, and a polarization pattern disposed between the lenses and polarizing light in a second polarization direction that intersects the first polarization direction.

23 Claims, 10 Drawing Sheets

DISPLAY DEVICE AND METHOD OF MANUFACTURING THE SAME

CROSS-REFERENCE TO RELATED APPLICATION

This application claims priority to and the benefit of Korean Patent Application No. 10-2023-0106656, filed in the Korean Intellectual Property Office on Aug. 16, 2023, the entire contents of which are incorporated by reference herein.

BACKGROUND

1. Field

One or more embodiments described herein relate to a display device and a method of manufacturing the same.

2. Description of the Related Art

A stereoscopic image display device stimulates the visual senses of a viewer in a way that allows an object to be perceived in three dimensions. This may be accomplished by providing different images to the left and right eyes of the viewer, to allow the viewer to view the stereoscopic image through binocular parallax between the left eye and the right eye.

Recently, research on autostereoscopic display devices has been conducted. Autostereoscopic display devices allow a stereoscopic image to be perceived without the viewer having to wear stereoscopic glasses. Autostereoscopic types are classified into a lenticular type (in which left-eye and right-eye images are separated using a cylindrical lens array) and a barrier type (in which left-eye and right-eye images are separated using a barrier).

SUMMARY

One or more embodiments provide a display device which includes a polarization pattern formed between lenses in a lens array to control the formation of images on a display device.

One or more embodiments may use the polarization pattern to control the transmission of light emitted through a liquid crystal layer of a display panel.

One or more embodiments may use the polarization pattern to transmit light to form a two-dimensional image when a polarization of light transmitted through the liquid crystal layer matches a polarization of the polarization pattern, and to block light to form a stereoscopic image when a polarization of light transmitted through the liquid crystal layer does not match the polarization of the polarization pattern POP.

One or more embodiments may block the aforementioned light to reduce crosstalk occurring between lenses.

One or more embodiments may also include a method of manufacturing a display device.

A display device according to embodiments of the present invention includes a display panel including pixels, a polarization layer disposed on the display panel and configured to polarize light in a first polarization direction, a liquid crystal layer disposed on the polarization layer and including liquid crystal molecules, a lens array disposed on the liquid crystal layer and including lenses, and a polarization pattern disposed between the lenses and configured to polarize light in a second polarization direction that intersects the first polarization direction.

In one embodiment, the first polarization direction may differ from the second polarization direction by an angle of 90°.

In one embodiment, the display device may further include a first substrate on which the liquid crystal layer is formed, and a second substrate on which the lens array is formed, wherein the first substrate is rubbed in a first rubbing direction, and the second substrate is rubbed in a second rubbing direction that intersects the first rubbing direction.

In one embodiment, the first rubbing direction may be substantially equal to the first polarization direction, and the second rubbing direction may be substantially equal to the second polarization direction.

In one embodiment, an alignment direction of the liquid crystal molecules may be controlled according to an electric field applied to the liquid crystal molecules.

In one embodiment, in a first mode, the liquid crystal layer may rotate light incident from the polarization layer in the second polarization direction.

In one embodiment, in a second mode, the liquid crystal layer may transmit light incident from the polarization layer without any rotational change.

In one embodiment, one of a major axis refractive index and a minor axis refractive index of the liquid crystal molecules may be substantially equal to a refractive index of at least one of the lenses.

In one embodiment, in a second mode, the lenses may generate a light field by refracting light incident on the lenses.

In one embodiment, the polarization pattern may overlap a boundary between the lenses.

In one embodiment, the lenses may be spaced apart from each other.

In one embodiment, a height of at least one of the lenses may be 27 μm, and a height of the liquid crystal layer may be 3 μm.

A method of manufacturing a display device according to embodiments of the present invention includes rubbing a first substrate in a first rubbing direction, forming a liquid crystal layer including liquid crystal molecules on the first substrate, forming a lens array including lenses on a second substrate, forming a polarization pattern, which polarizes light in a second polarization direction intersecting a first polarization direction, between the lenses, rubbing the second substrate in a second rubbing direction, coupling the first substrate to the second substrate, attaching the first substrate to a polarization layer configured to polarize the light in the first polarization direction, and attaching the polarization layer to a display panel.

In one embodiment, the first polarization direction may differ from the second polarization direction by an angle of 90°.

In one embodiment, the first rubbing direction may be substantially equal to the first polarization direction, and the second rubbing direction may be substantially equal to the second polarization direction.

In one embodiment, an alignment direction of the liquid crystal molecules may be controlled according to an electric field applied to the liquid crystal molecule.

In one embodiment, the method may further include forming a lower electrode on the first substrate, and forming an upper electrode on the second substrate.

In one embodiment, the liquid crystal layer may rotate light incident from the polarization layer in the second polarization direction in a first mode and may transmit the light incident from the polarization layer without any change in a second mode.

In one embodiment, one of a major axis refractive index and a minor axis refractive index of the liquid crystal molecules may be substantially equal to a refractive index of at least one of the lenses.

A method of manufacturing a display device according to embodiments of the present invention includes rubbing a first substrate in a first rubbing direction, forming a lens array including lenses on a second substrate, forming a polarization pattern, which polarizes light in a second polarization direction intersecting a first polarization direction, between the lenses, rubbing the second substrate in a second rubbing direction, coupling the first substrate to the second substrate, forming a liquid crystal layer including liquid crystal molecules between the first substrate and the second substrate, attaching the first substrate to a polarization layer configured to polarize the light in the first polarization direction, and attaching the polarization layer to a display panel.

In accordance with one or more additional embodiments, a display device includes an array of lenses; a display panel including pixels; a polarization pattern between the lenses; and a liquid crystal layer between the array of lenses and the display panel, wherein the polarization pattern is configured to block light transmitted through the liquid crystal layer having a first polarization and pass light transmitted through the liquid crystal layer having a second polarization. The light transmitted through the liquid crystal layer having the second polarization may form a two-dimensional image, and the light transmitted through the liquid crystal layer having the first polarization may form a stereoscopic image. Crosstalk between adjacent ones of the lenses may be reduced when the polarization pattern blocks the light transmitted through the liquid crystal layer having the first polarization.

DETAILED DESCRIPTION OF THE EMBODIMENTS

Figure 1:
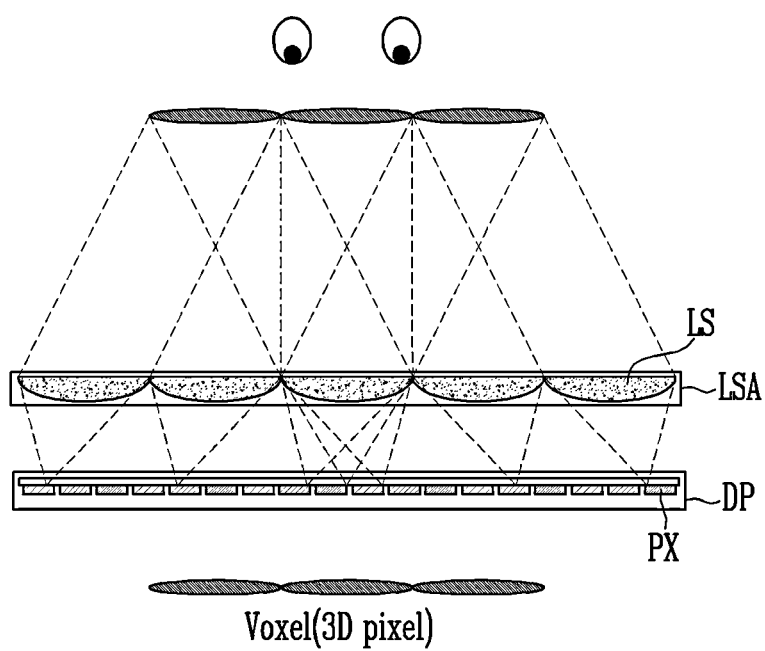
FIG. 1 is a view for describing a lens array-type display device.

Throughout the specification, It will be understood that when an element is referred to as being "coupled" or "connected" to another element, it can be directly coupled or connected to the other element or intervening elements may be present therebetween.

Various embodiments are described with reference to drawings that schematically illustrate ideal embodiments. Accordingly, it will be expected that the shapes may vary depending, for example, on tolerances and/or manufacturing techniques. Accordingly, the embodiments disclosed herein should not be construed as limited to the specific shapes shown herein, but should be construed to include deviations in shapes that result from, for instance, manufacturing. As such, the shapes shown in the drawings may not depict the actual shapes of regions of the device, and the present embodiments are not limited thereto.

Figure 2:
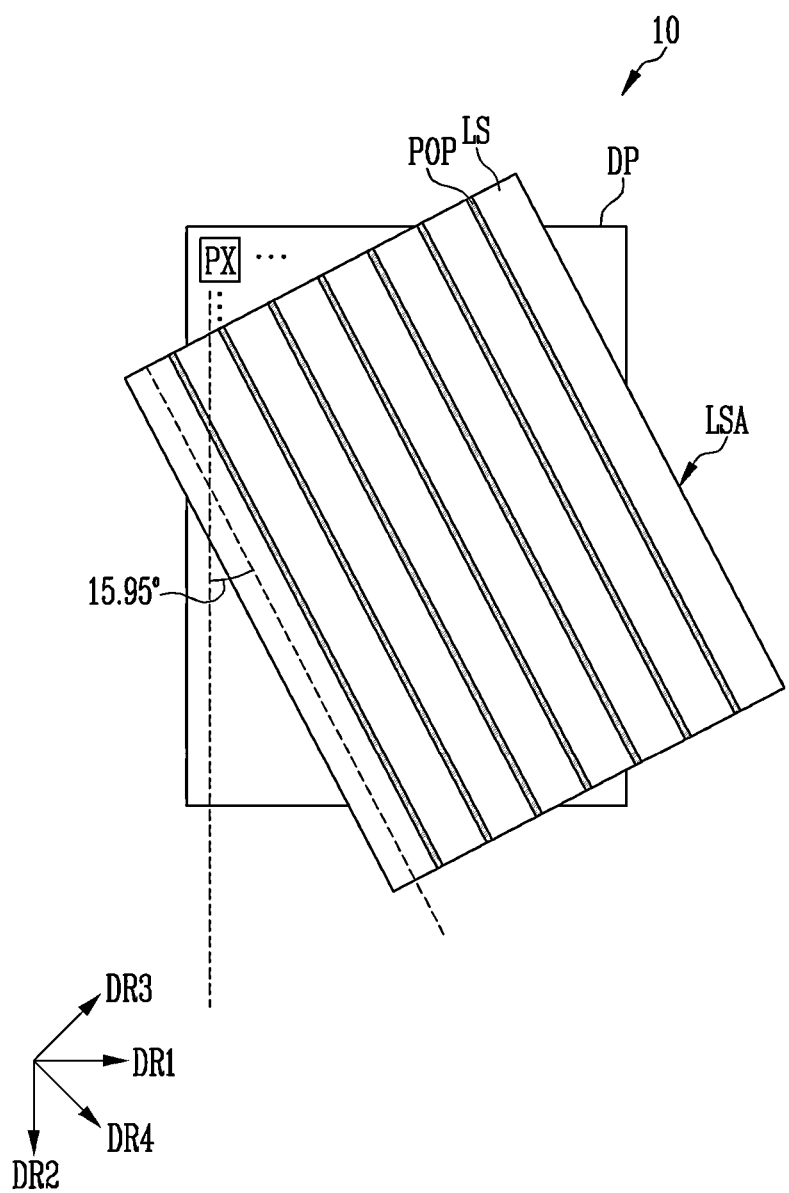
FIG. 2 is a schematic view illustrating a display device according to embodiments of the present invention.

FIG. 1 is a view for describing a lens array-type display device. FIG. 2 is a schematic view illustrating a display device according to embodiments of the present invention.

Referring to FIGS. 1 and 2, a display device 10 may include a display panel DP and a lens array LSA. For example, the display device 10 may be a stereoscopic image display device that displays a stereoscopic image (three-dimensional (3D) image)).

The display panel DP may include pixels PX that emit light to display an image. In one embodiment, each of the pixels PX may output one of red light, green light, and blue light. However, this is merely an example, and the color of light emitted from the pixel PX is not limited thereto. Light having various colors may be output for full-color implementation.

In one embodiment, the display panel DP may be connected to a driving circuit that drives the pixels PX. The driving circuit may perform a function of at least one of a gate driver, a data driver, or a driving controller. For example, the driving circuit may be positioned on a rear surface of the display panel DP.

In one embodiment, the pixels PX may be disposed on a front surface of the display panel DP to form an emission surface. An image may be displayed based on the light emitted from the pixels PX. The pixels PX may be arranged in a plurality of pixel rows and a plurality of pixel columns. Here, the pixel rows may correspond to pixel groups, respectively, with the pixels in each pixel group connected to the same gate line. The pixel columns may correspond to pixel groups, respectively, with each pixel column connected to the same data line. For example, the pixel rows may be arranged in a second direction DR2, and the pixel columns may be arranged in a first direction DR1.

In one embodiment, the display panel DP may include a pixel circuit layer and a display element layer which are disposed on a certain substrate to form the pixels PX. The display panel DP may further include an encapsulation structure that encapsulates the display element layer. Furthermore, the display panel DP may include a polarization layer including a phase retarder and/or a polarizer disposed on the encapsulation structure.

The pixel circuit layer may include pixel circuits configured to drive light-emitting elements of the pixels PX. For example, the pixel circuit layer may include transistors and signal lines/power lines connected to the transistors. The pixel circuit layer may have a stacked structure to form the transistors.

The display element layer may be disposed on the pixel circuit layer. The display element layer may include the light-emitting elements. The light-emitting elements may be electrically connected to the pixel circuits of the pixel circuit layer. In one embodiment, the light-emitting element may be a self-luminous element. The self-luminous element may include an organic light-emitting element, an inorganic light-emitting element, or a light-emitting element made of a combination of an inorganic material and an organic material. That is, the display panel DP may be a self-luminous display panel. However, this is merely an example. In one embodiment, the light-emitting element may include a light-emitting element (e.g., quantum dot display element) that emits light by changing the wavelength of light emitted using quantum dots.

In addition, the display panel DP may be implemented as a liquid crystal display panel, a plasma display panel, or a display panel that displays images using quantum dots.

The lens array LSA may be disposed on the display panel DP either directly or indirectly, and may include individual lenses LS that refract light incident from the pixels PX. For example, the lens array LSA may be implemented as a lenticular lens array, a micro lens array, or the like.

A light field display is a three-dimensional (3D) display which generates a light field expressed as a vector distribution (intensity, direction) of light in a space using a flat display and optical elements (for example, the lens array LSA), to thereby implement a stereoscopic image. The light field display is a display technology that is expected to be used in a variety of ways through convergence with augmented reality (AR) technology. This display technology allows the depth and side surfaces of an object to be seen, which enables more naturally looking stereoscopic images.

A light field may be implemented through various methods. For example, the light field may be generated through a method of generating a light field in a plurality of directions using a plurality of projectors. Another method controls the direction of light using a diffraction grating. Another method controls the direction and intensity (luminance) of light according to a combination of each pixel using two or more panels. Another method controls the direction of light using a pinhole or barrier. And, another method controls the direction of the refraction of light through a lens array.

In one embodiment, as shown in FIG. 1, the display device 10 of a lens array type may generate a light field to display a stereoscopic image (3D image).

A series of pixels PX are assigned to and overlap each lens LS, and light from each pixel PX is refracted by the lens LS to travel only in a specific predetermined direction. Through this structure, a light field is expressed according to the intensity and direction of light. When a viewer looks at the display device in the light field generated in this way, the viewer may perceive the three-dimensional effect of a corresponding image.

Image information, according to a viewpoint of a viewer in the light field, may be defined and processed in a voxel unit. A voxel may be understood as graphic information that defines a certain point (or pixel) in a 3D space.

In one embodiment, the lens array LSA may include the lenses LS (for example, lenticular lenses) having a predetermined curved (e.g., semi-cylindrical shape, see FIG. 3) extending in one direction. In one embodiment, as shown in FIG. 2, the lenses LS may be arranged and extend at a predetermined slant angle with respect to the first direction DR1 (slanted arrangement). For example, the lenses LS may be arranged to be inclined at an angle of 15.95° with respect to the pixels PX. However, this is merely an example, and an extending direction (and arrangement direction) of the lenses LS may be arranged at a different angle in another embodiment.

The size and arrangement of the lenses LS may be determined according to at least one condition, such as, but not limited to, the size of a pixel area, viewing distance, pixel size, resolution, and pixel array structure.

In one embodiment, the lens LS may include a microlens rather than a lenticular lens. In a plane view, the microlens may have a predetermined shape, e.g., hexagonal, circular, or oval shape.

In one embodiment, a polarization pattern POP may be disposed between the lenses LS. A detailed description thereof will be provided below.

Interference may occur at a boundary between the lenses LS. The influence of this interference due to diffraction of emitted light may be significant. This interference may generate crosstalk in the stereoscopic image, which, in turn, may degrade display quality. In addition, an additional component of crosstalk may occur due to other effects (e.g., lens aberration, defective orientation, or the like) at certain portions (e.g., end portions) of the lens LS. Due to this crosstalk, the polarization pattern POP may be disposed between the lenses LS.

Figure 3:
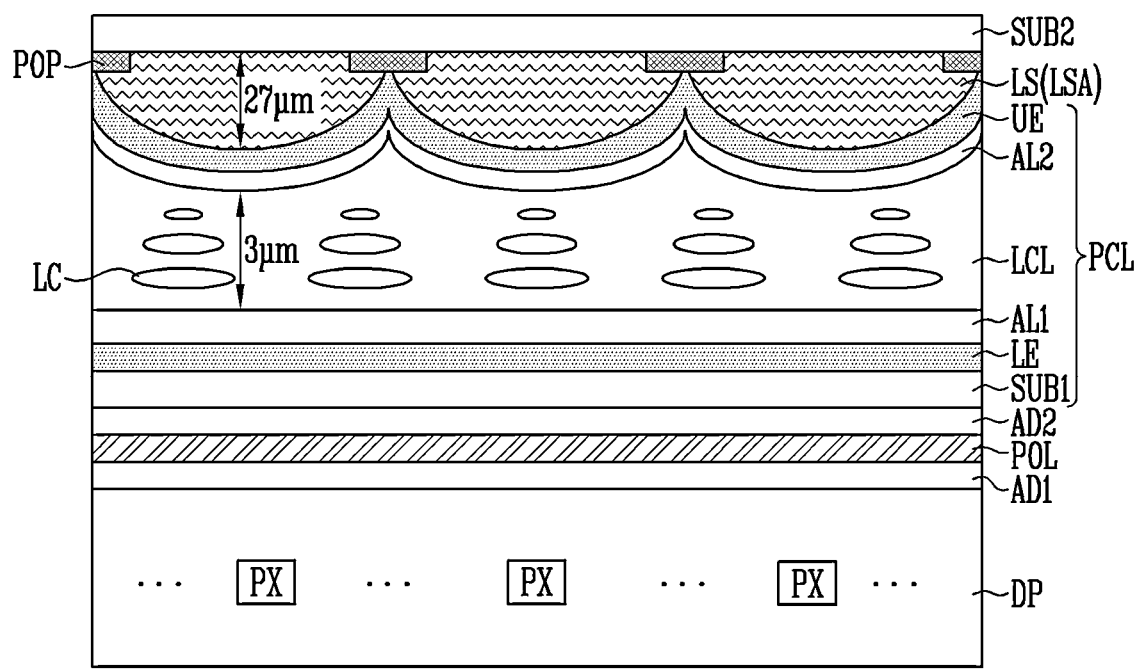
FIG. 3 is a cross-sectional view illustrating an example of the display device of FIG. 2.
Figure 4:
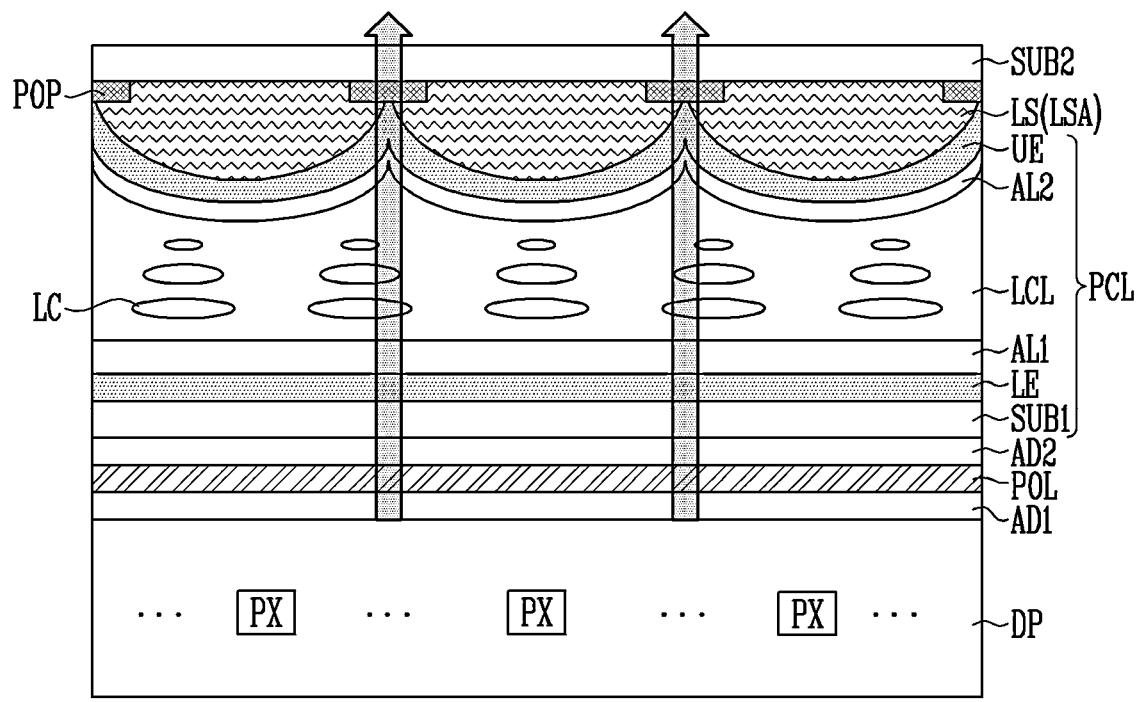
FIG. 4 is a cross-sectional view illustrating an example in which the display device of FIG. 2 operates in a first mode.
Figure 5:
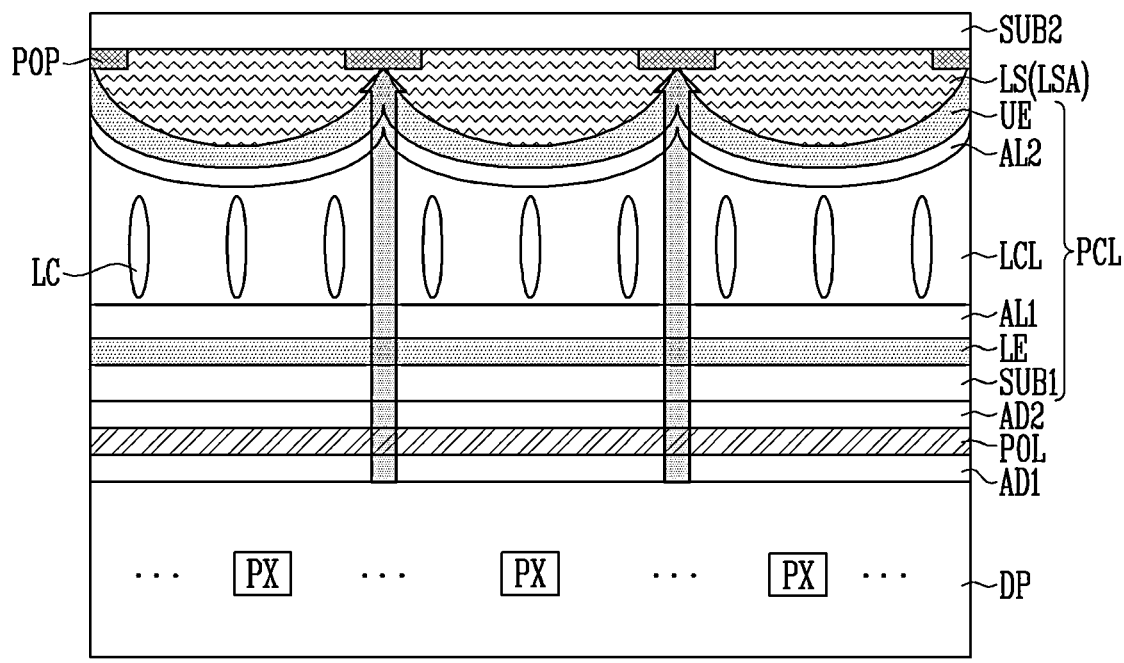
FIG. 5 is a cross-sectional view illustrating an example in which the display device of FIG. 2 operates in a second mode.

FIG. 3 is a cross-sectional view illustrating an example of the display device of FIG. 2. FIG. 4 is a cross-sectional view illustrating an example in which the display device of FIG. 2 operates in a first mode. FIG. 5 is a cross-sectional view illustrating an example in which the display device of FIG. 2 operates in a second mode.

Referring to FIGS. 1 to 5, the display device 10 may include a display panel DP, a polarization layer POL, a polarization control layer PCL, a lens array LSA, and a polarization pattern POP.

The polarization layer POL may be disposed between the display panel DP and the polarization control layer PCL. The polarization layer POL may polarize light in a first polarization direction. For example, The polarization layer POL may polarize light incident from the display panel DP in the first polarization direction.

The polarization layer POL may be disposed, either directly or indirectly, on the display panel DP. In one embodiment, the polarization layer POL may be attached to the display panel DP through a first transparent adhesive material AD1. The first transparent adhesive material AD1 may include an optically clear adhesive (OCA) or an optically clear resin (OCR).

The polarization control layer PCL may be disposed between the lens array LSA and the display panel DP. The polarization control layer PCL may control the polarization of light incident from the polarization layer POL.

The polarization control layer PCL may include a first substrate SUB1, a lower electrode layer LE, a liquid crystal layer LCL, and an upper electrode layer UE. The first substrate SUB1 may be disposed on the polarization layer POL. In one embodiment, the first substrate SUB1 may be attached to the polarization layer POL through a second transparent adhesive material AD2. The second transparent adhesive material AD2 may include an OCA or an OCR.

The first substrate SUB1 may be made of a transparent insulating material. For example, the first substrate SUB1 may be made of an organic material selected from the group consisting of polyethersulphone (PES), polyacrylate (PAR), polyetherimide (PEI), polyethylene napthalate (PEN), polyethyeleneterepthalate (PET), polyphenylene sulfide (PPS), polyallylate, polyimide, polycarbonate (PC), cellulose triacetate (SAC), and cellulose acetate propionate (CAP).

In one embodiment, the first substrate SUB1 may also be made of an inorganic material. For example, the first substrate SUB1 may include a silicon nitride layer, a silicon oxy nitride layer, a silicon oxide layer, a titanium oxide layer, or an aluminum oxide layer.

The lower electrode layer LE may be disposed on the first substrate SUB1. The lower electrode layer LE may include a transparent conductive material such as indium tin oxide (ITO). A reference voltage may be supplied to the lower electrode layer LE. The reference voltage serves as a reference for turning on/off the driving of the liquid crystal layer LCL.

The upper electrode layer UE may be disposed opposite to the lower electrode layer LE. The upper electrode layer UE may include a transparent conductive material such as ITO. A driving voltage may be supplied to the upper electrode layer UE. The driving voltage may control turning on/off the driving of the liquid crystal layer LCL. An electric field may be generated between the upper electrode layer UE and the lower electrode layer LE according to whether the driving voltage is applied, and an alignment direction (or orientation) of liquid crystal molecules LC included in the liquid crystal layer LCL may be controlled by the electric field. However, this is merely an example. The driving voltage may be supplied to the lower electrode layer LE, and the reference voltage may be supplied to the upper electrode layer UE in other embodiments.

The liquid crystal layer LCL may be disposed between the lower electrode layer LE and the upper electrode layer UE. The liquid crystal layer LCL may include the liquid crystal molecules LC having an alignment direction controlled by the presence or absence of the electric field.

The liquid crystal layer LCL may rotate light incident from the polarization layer POL in a second polarization direction in a two-dimensional (2D) image mode (that is, the first mode corresponding to FIG. 4). In this case, the second polarization direction matches the polarization direction of the polarization pattern POP. As a result, the light incident from the polarization layer POL forms the two-dimensional image. The liquid crystal layer LCL may transmit light, which is incident from the polarization layer POL in a 3D mode (that is, the second mode corresponding to FIG. 5), without any change. In this case, the light incident on the lens array LSA is polarized in the first polarization direction which does not match the second polarization direction of the polarization pattern POP. As a result, light incident from the polarization layer POL produces a stereoscopic image. As will be discussed in greater detail, the polarization pattern POP may block light transmitted through the liquid crystal layer LCL when operating in 3D mode, to thereby generate a stereoscopic image with reduced crosstalk.

In one embodiment, the liquid crystal layer LCL may be driven in a twisted nematic (TN) liquid crystal mode with a predetermined (e.g., $\lambda/2$) phase difference. However, this is merely an example, and the liquid crystal layer LCL may be driven in a vertical alignment (VA), optical compensated bend (OCB), or electrically controlled birefringence (ECB) liquid crystal mode in another embodiment.

For example, in a state in which an electric field is not applied to the liquid crystal molecules LC in the TN liquid crystal mode, the liquid crystal molecules LC may be arranged (aligned) to rotate linear polarization of incident light from the first polarization direction (for example, a vertical direction) to linear polarization in the second polarization direction (for example, a horizontal direction) that intersects the first polarization direction. Accordingly, the liquid crystal layer LCL may linearly polarize light incident from the display panel DP in the second polarization direction and transmit light. Light linearly polarized in the second polarization direction may be provided to the lens array LSA and the polarization pattern POP, and an image may be displayed in the 2D image mode (for example, the first mode). This is because the second polarization direction of the light provided to the lens array LSA matches the second polarization direction of the light that is polarized by the polarization pattern POP.

On the other hand, in the stereoscopic image mode (for example, the second mode), a driving voltage may be applied to the upper electrode layer UE, and an electric field may be generated between the upper electrode layer UE and the lower electrode layer LE. In this case, the liquid crystal molecules LC may be arranged (aligned) to transmit light, which is incident on the generated electric field, without any change (e.g., without any rotational change). For example, light, which is incident from the polarization layer POL and is polarized in the first polarization direction (for example, the vertical direction), may be incident on the lens array LSA without any change. Because the first polarization direction of the light provided to the lens array LSA does not match the second polarization direction of the polarization pattern POP, the polarization pattern POP may block crosstalk between adjacent ones of the lenses LS in the second mode.

That is, in forming the stereoscopic image, light refracted in the lens array LSA may be divided into a light beam having a traveling path corresponding to a right-eye image and a light beam having a traveling path corresponding to a left-eye image, and the light beam may converge to different focal points. As a result, a stereoscopic image may be implemented. That is, the lenses LS in the lens array LSA may refract light incident on the lenses LS to generate a light field in the second mode.

One of a major axis refractive index and a minor axis refractive index of the liquid crystal molecules LC may be substantially equal to a refractive index of at least one of the lenses LS. Hereinafter, for convenience of description, it is assumed that the major axis refractive index of the liquid crystal molecules LC is substantially equal to the refractive index of the lenses LS. However, the embodiments of the present invention are not limited thereto.

When light incident from the polarization control layer PCL oscillates in an axial direction having a different refractive index from the lenses LS, the light may be emitted by being refracted at an interface based on a difference in refractive index between the lenses LS and the liquid crystal layer LCL. In this case, a stereoscopic image may be displayed by refraction of emitted light.

When light incident from the polarization control layer PCL vibrates in an axial direction having the same refractive index as the lenses LS, the incident light may be emitted along the vibration of the incident light without any change.

In this way, a stereoscopic (3D image) may be implemented according to a relationship between a vibration direction of incident light provided by the lens array LSA and the refractive index of the lenses LS.

For example, in the first mode, light incident on the liquid crystal layer LCL may be affected by the major axis refractive index of the liquid crystal molecules LC according to the alignment of the liquid crystal molecules LC. Accordingly, light incident from the liquid crystal layer LCL may not be refracted while passing through the lenses LS.

For example, in the second mode, light incident on the liquid crystal layer LCL may be affected by the minor axis refractive index of the liquid crystal molecules LC according to the alignment of the liquid crystal molecules LC. Accordingly, light incident from the liquid crystal layer LCL may be refracted while passing through the lenses LS.

The upper electrode layer UE that covers the lenses LS may be formed on the second substrate SUB2. For example, a material constituting the upper electrode layer UE may be deposited on one surface of the lens LS.

In one embodiment, the lens array LSA may include an array of the lenses LS having a predetermined (e.g., semi-cylindrical convex) shape. For example, the lens LS may be a lenticular lens. However, this is merely an example, and in other embodiments the lenses LS may be formed as micro lenses, each of which has a micro-sized area.

In the present embodiment, the lenses LS are illustrated as having a convex shape oriented in a direction towards the first substrate SUB1, but the embodiments of the present invention are not limited thereto. For example, the lenses LS may have a convex shape oriented in a direction towards the second substrate SUB2.

In one embodiment, the liquid crystal layer LCL may be formed on the first substrate SUB1, and the lens array LSA may be formed on the second substrate SUB2. In addition, the first substrate SUB1 on which the liquid crystal layer LCL is formed may be coupled to the second substrate SUB2 on which the lens array LSA is formed. In one embodiment, a first alignment layer AL1 covering the lower electrode layer LE may be disposed on the first substrate SUB1. In one embodiment, a second alignment layer AL2 covering the upper electrode layer UE may be disposed on the second substrate SUB2.

For example, the first alignment layer AL1 may be formed on the first substrate SUB1, the first substrate SUB1 may be rubbed in a first rubbing direction (that is, the first alignment layer AL1 may be rubbed in the first rubbing direction), and the liquid crystal layer LCL may be formed on the first substrate SUB1. For example, the second alignment layer AL2 may be formed on the second substrate SUB2, and the second substrate SUB2 may be rubbed in a second rubbing direction that intersects the first rubbing direction (that is, the second alignment layer AL2 may be rubbed in the second rubbing direction). For example, the first substrate SUB1 on which the liquid crystal layer LCL is formed may be coupled to the second substrate SUB2 on which the lens array LSA is formed.

In one embodiment, after the first substrate SUB1 is coupled to the second substrate SUB2 on which the lens array LSA is disposed, the liquid crystal layer LCL may be formed between the first substrate SUB1 and the second substrate SUB2.

For example, the first alignment layer AL1 may be formed on the first substrate SUB1, and the first substrate SUB1 may be rubbed in the first rubbing direction (that is, the first alignment layer AL1 may be rubbed in the first rubbing direction). For example, the second alignment layer AL2 may be formed on the second substrate SUB2, and the second substrate SUB2 may be rubbed in the second rubbing direction (that is, the second alignment layer AL2 may be rubbed in the second rubbing direction). For example, the first substrate SUB1 and the second substrate SUB2 may be combined, and the liquid crystal molecules LC may be injected through a hole between the first substrate SUB1 and the second substrate SUB2.

In one embodiment, the first rubbing direction may be a direction (that is, a third direction DR3) intersecting the lenses LS. The second rubbing direction may be a direction (that is, a fourth direction DR4) parallel to the lenses LS. In one embodiment, the first rubbing direction may be substantially the same as the first polarization direction, and the second rubbing direction may be substantially the same as the second polarization direction. For example, the major axes of the liquid crystal molecules LC adjacent to the first substrate SUB1 may be arranged in the first rubbing direction, and the major axes of the liquid crystal molecules LC adjacent to the second substrate SUB2 may be arranged in the second rubbing direction.

The second substrate SUB2 may serve as a substrate (mother substrate) for forming/manufacturing the lens array LSA. In addition, the lens array LSA can be protected from external contamination, shock, scratches, or the like.

In one embodiment, the second substrate SUB2 may be made of a transparent insulating material. The second substrate SUB2 may include a transparent organic material or a transparent inorganic material that may constitute the above-described first substrate SUB1. For example, the second substrate SUB2 may include the same material as the first substrate SUB1.

The polarization pattern POP polarizes light in the second polarization direction and may be disposed between the lenses LS. For example, the polarization pattern POP may extend in a diagonal direction (that is, the fourth direction DR4) along a boundary between the lenses LS that are arranged in a slanted orientation. For example, the polarization pattern POP may transmit linearly polarized light in the second polarization direction.

In one embodiment, the polarization pattern POP may be in contact with the second substrate SUB2. For example, the polarization pattern POP may be formed using a patterning method.

In one embodiment, the first polarization direction may differ from the second polarization direction by a predetermined angle, e.g., 90°. For example, when the first polarization direction is a vertical direction, the second polarization direction may be a horizontal direction. For example, when the second polarization direction is a vertical direction, the first polarization direction may be a horizontal direction. Hereinafter, for convenience of description, it is assumed that the first polarization direction is a vertical direction and the second polarization direction is a horizontal direction. However, the embodiments of the present invention are not limited thereto where the difference angle between the first and second polarization directions is 90°.

For example, as shown in FIG. 4, light incident from the display panel DP may be polarized in the vertical direction while passing through the polarization layer POL. The light polarized in the vertical direction may rotate in the horizontal direction while passing through the liquid crystal layer LCL. The light rotating in the horizontal direction may pass through the polarization pattern POP without any change (e.g., without being blocked by the polarization pattern POP), thereby producing a two-dimensional image.

For example, as shown in FIG. 5, light incident from the display panel DP may be polarized in the vertical direction while passing through the polarization layer POL. The light polarized in the vertical direction may pass through the liquid crystal layer LCL without any rotational change. The light passing through the liquid crystal layer LCL without any rotational change may be blocked by the polarization pattern POP, thereby producing a stereoscopic image with reduced crosstalk.

In one embodiment, the height of the lens LS may be greater than a height of the liquid crystal layer LCL. For example, as shown in FIG. 3, the height of the lens LS may be 27 μm and the height of the liquid crystal layer LCL may be 3 μm. One or more of these heights may be different in other embodiments.

Moreover, as shown in FIG. 3, the height of the lens LS may correspond to the length of the most convex portion (for example, the thickest portion) in a cross-sectional view of the lens LS. The height of the liquid crystal layer LCL may be a height of the liquid crystal layer LCL at a position corresponding to the thickest portion of the lens LS in the cross-sectional view.

Figure 6:
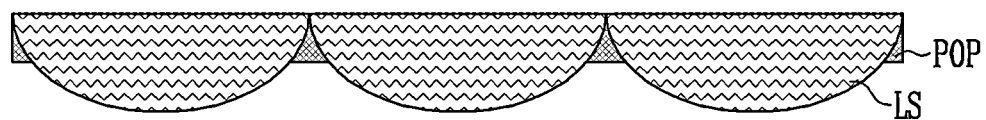
FIGS. 6 and 7 are views illustrating examples in which a polarization pattern of FIG. 3 is formed between lenses.
Figure 7:
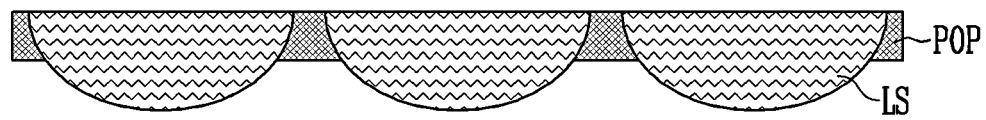

FIGS. 6 and 7 are views illustrating examples in which the polarization pattern of FIG. 3 is formed between the lenses.

Referring to FIG. 6, the polarization pattern POP may overlap the boundary between the lenses LS. In this case, adjacent ones of the lenses LS may be in contact with each other. The polarization pattern POP may be formed at the boundaries at which the lenses LS are in contact.

Referring to FIG. 7, the lenses LS may be spaced apart from each other. In this case, the polarization pattern POP may be disposed between adjacent ones of the lenses LS. For example, when the lenses LS are formed, an empty space may be formed between adjacent ones of the lenses LS. The polarization pattern POP may be formed to overlap the empty space.

Figure 8:
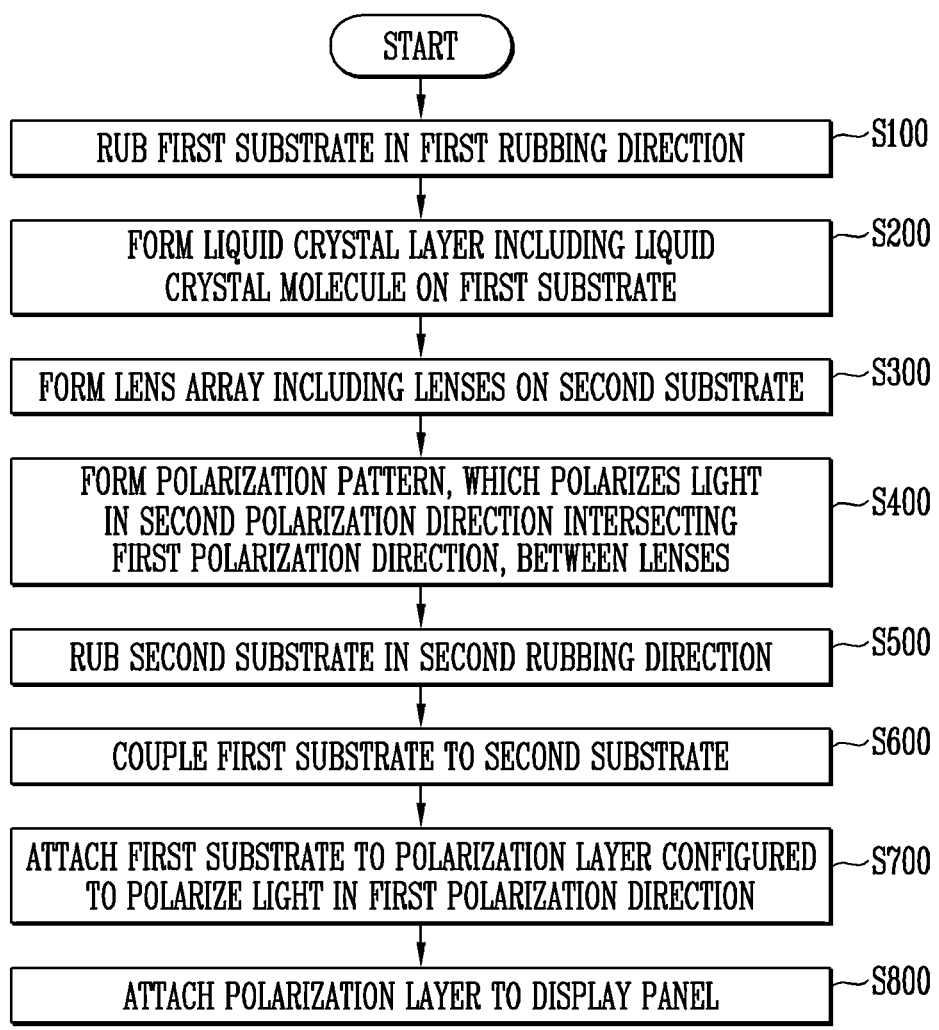
FIG. 8 is a flowchart illustrating a method of manufacturing a display device according to embodiments of the present invention.

FIG. 8 is a flowchart illustrating a method of manufacturing a display device according to embodiments of the present invention.

Referring to FIG. 8, the manufacturing method of the display device of FIG. 8 includes rubbing a first substrate in a first rubbing direction (S100), forming a liquid crystal layer containing liquid crystal molecules on the first substrate (S200). The method further includes forming a lens array including lenses on a substrate (S300), forming a polarization pattern between the lenses to polarize light in a second polarization direction that intersects the first polarization direction (S400), and forming the second substrate into a second polarization direction. The method further includes rubbing the second substrate in the second rubbing direction (S500), combining (or coupling together) the first substrate and the second substrate (S600), attaching the first substrate and a polarizing layer that polarizes the light in the first polarization direction (S700), and attaching the polarization layer and to the display panel (S800).

A liquid crystal layer may be formed on the first substrate, and a lens array may be formed on the second substrate. Also, the first substrate on which the liquid crystal layer is formed and the second substrate on which the lens array is formed can be combined. In one embodiment, a first alignment layer covering the lower electrode layer may be disposed on the first substrate. In one embodiment, a second alignment layer covering the upper electrode layer may be disposed on the second substrate.

For example, a first alignment layer may be formed on the first substrate, the first substrate may be rubbed in a first rubbing direction (e.g., the first alignment layer may be rubbed in the first rubbing direction), and a liquid crystal layer may be formed on the first substrate. For example, a second alignment layer may be formed on the second substrate, and the second substrate may be rubbed in a second rubbing direction that intersects the first rubbing direction (e.g., the second alignment layer is rubbed in the second rubbing direction). For example, the first substrate on which the liquid crystal layer is formed may be coupled to the second substrate on which the lens array is formed.

Figure 9:
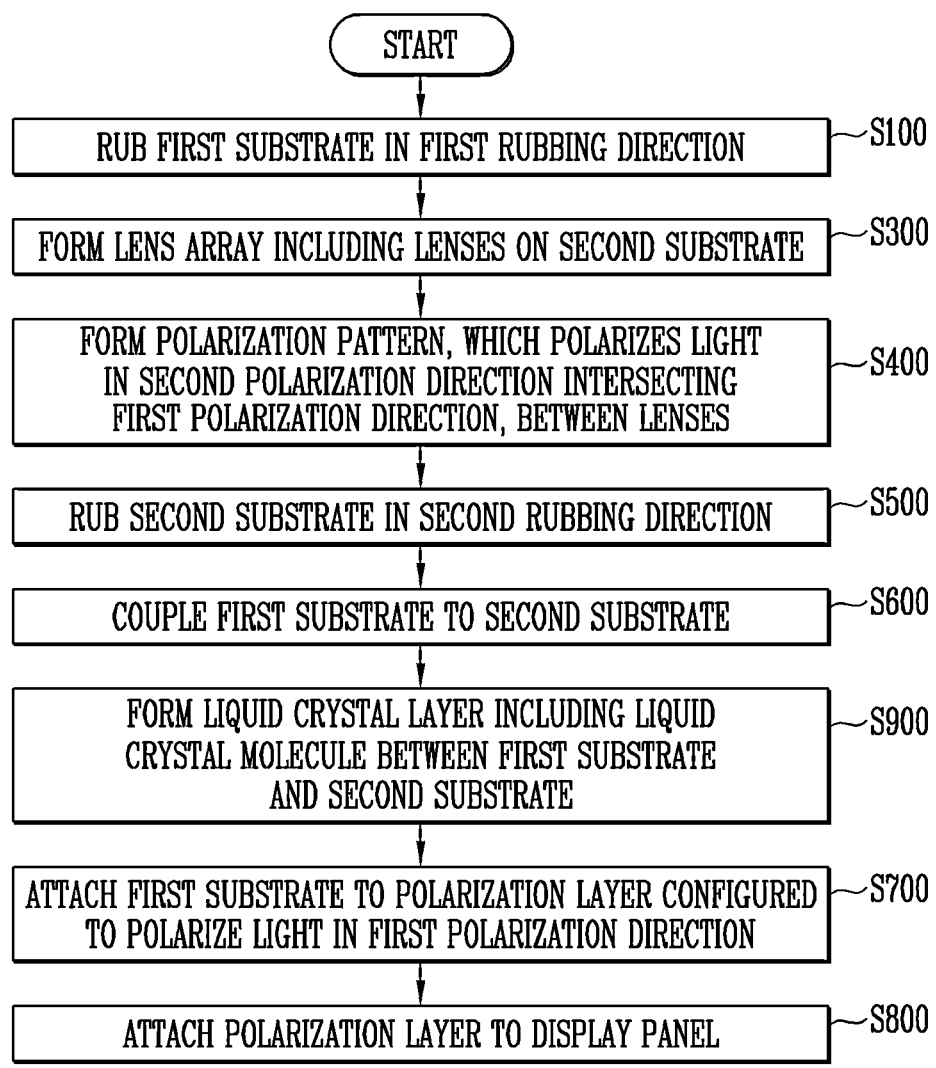
FIG. 9 is a flowchart illustrating a method of manufacturing a display device according to embodiments of the present invention.

FIG. 9 is a flowchart illustrating a method of manufacturing a display device according to embodiments of the present invention.

Referring to FIG. 9, in the method of manufacturing a display device of FIG. 9, a first substrate may be rubbed in in a first rubbing direction (S100), a lens array including lenses may be formed on a second substrate (S300), a polarization pattern, which polarizes light in a second polarization direction intersecting a first polarization direction, may be formed between the lenses (S400), the second substrate may be rubbed in a second rubbing direction (S500), the first substrate may be coupled to the second substrate (S600), a liquid crystal layer including liquid crystal molecules may be formed between the first substrate and the second substrate (S900), the first substrate may be attached to a polarization layer which polarizes light in the first polarization direction (S700), and the polarization layer may be attached to a display panel (S800).

After the first substrate is coupled to the second substrate on which the lens array is formed, the liquid crystal layer may be formed between the first substrate and the second substrate.

For example, a first alignment layer may be formed on a first substrate, and the first substrate may be rubbed in the first rubbing direction (e.g., the first alignment layer may be rubbed in the first rubbing direction). For example, a second alignment layer may be formed on the second substrate, and the second substrate may be rubbed in the second rubbing direction (e.g., the second alignment layer may be rubbed in the second rubbing direction). For example, the first substrate may be coupled to second substrate, and liquid crystal molecules may be injected through a hole between the first substrate and the second substrate.

Figure 10:
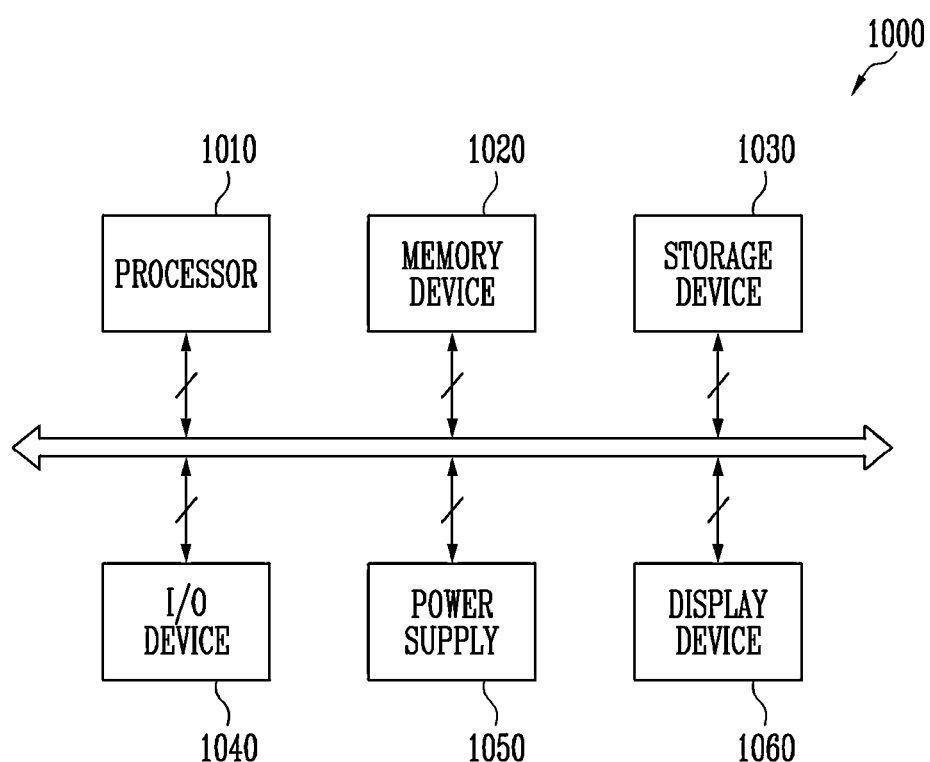
FIG. 10 is a block diagram illustrating an electronic device according to embodiments of the present invention.
Figure 11:
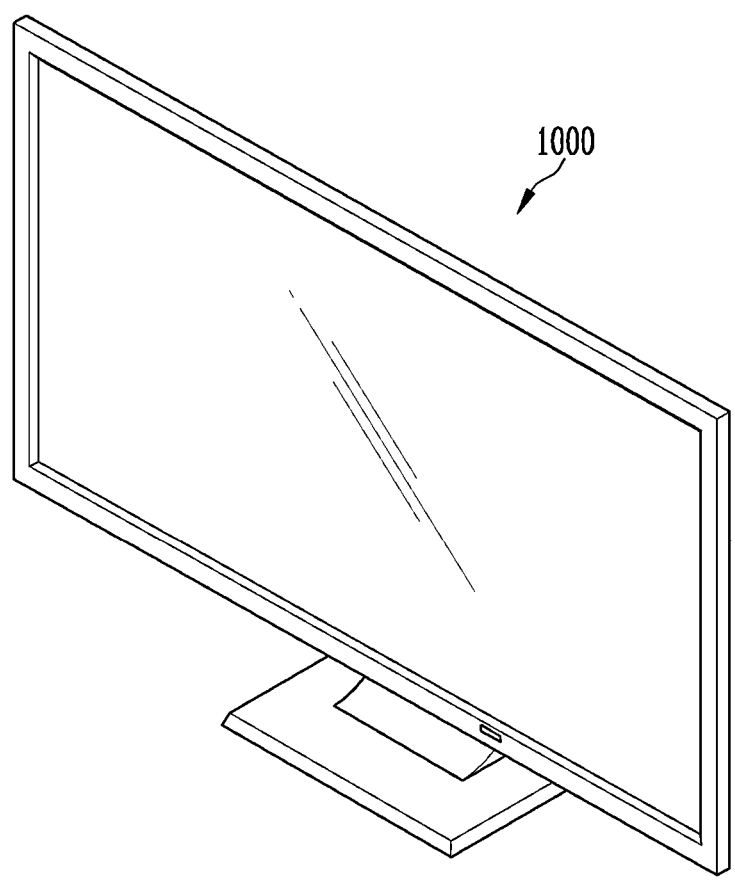
FIG. 11 is a view illustrating an example in which the electronic device of FIG. 10 is implemented as a television.

FIG. 10 is a block diagram illustrating an electronic device according to embodiments of the present invention. FIG. 11 is a view illustrating an example in which the electronic device of FIG. 10 is implemented as a television.

Referring to FIGS. 10 and 11, an electronic device 1000 may include a processor 1010, a memory device 1020, a storage device 1030, an input/output device 1040, a power supply device 1050, and a display device 1060. In this case, the display device 1060 may be the display device of FIG. 1. In addition, the electronic device 1000 may further include various ports that may communicate with a video card, a sound card, a memory card, a universal serial bus (USB) device, and the like, or may communicate with other systems. In one embodiment, as shown in FIG. 11, the electronic device 1000 may be implemented as a television. However, this is merely an example, and the electronic device 1000 is not limited thereto. For example, the electronic device 1000 may be implemented as a mobile phone, a video phone, a smart pad, a smart watch, a tablet personnel computer (PC), a vehicle navigation device, a computer monitor, a laptop, a head mounted display device, or the like.

The processor 1010 may perform specific calculations or tasks. According to embodiments, the processor 1010 may be a microprocessor, a central processing unit, an application processor, or another type of processing logic. The processor 1010 may be connected to other components through an address bus, a control bus, and a data bus. According to embodiments, the processor 1010 may also be connected to an expansion bus such as a peripheral component interconnect (PCI) bus.

The memory device 1020 may store data for operation of the electronic device 1000. For example, the memory device 1020 may include non-volatile memory devices such as an erasable programmable read-only memory (EPROM) device, an electrically erasable programmable read-only memory (EEPROM) device, a flash memory device, a phase change random access memory (PRAM) device, a resistance random access memory (RRAM) device, a nano-floating gate memory (NFGM) device, a polymer random access memory (PoRAM) device, a magnetic random access memory (MRAM) device, and a ferroelectric random access memory (FRAM) device, and/or volatile memory devices such as a dynamic random access memory (DRAM) device, a static random access Memory (SRAM) device, and a mobile DRAM device.

The storage device 1030 may include a solid state drive (SSD), a hard disk drive (HDD), a CD-ROM, and the like.

The input/output device 1040 may include an input device such as a keyboard, a keypad, a touchpad, a touch screen, or a mouse and an output means such as a speaker or a printer. According to embodiments, the display device 1060 may be included in the input/output device 1040.

The power supply device 1050 may supply power for operation of the electronic device 1000. For example, the power supply device 1050 may be a power management integrated circuit (PMIC).

The display device 1060 may display an image corresponding to visual information of the electronic device 1000. In this case, the display device 1060 may be an organic light-emitting display device or a quantum dot light-emitting display device, but is not limited thereto. The display device 1060 may be connected to other components through the buses or other communication links. In accordance with one or more of the aforementioned embodiments, since a display device according to embodiments of the present invention includes a polarization pattern between lenses, it is possible to reduce or minimize crosstalk due to, for example, lens aberration, light diffraction, and/or defective alignment at end portions of the lens.

However, the effect of the embodiments of the present invention is not limited to the above, and within the scope not exceeding the idea and the field of the embodiments of the present invention, various expansions may be made.

EXAMPLES OF INDUSTRIAL APPLICABILITY

One or more embodiments described herein may be applied to display devices and electronic devices including the same. For example, one or more of the embodiments may be applied to digital TVs, 3D TVs, mobile phones, smartphones, tablet computers, VR devices, PCs, home electronic devices, laptop computers, PDAs, PMPs, digital cameras, music players, portable game consoles, navigation devices, and the like.

While the embodiments of the present invention have been described with reference to embodiments, it will be understood by those skilled in the art that various changes and modifications may be made without departing from the spirit and scope of the embodiments of the present invention as defined by the appended claims. The embodiments may be combined to form additional embodiments.

What is claimed is:

1. A display device comprising:
    a display panel including pixels;
    a polarization layer disposed on the display panel and configured to polarize light in a first polarization direction;
    a liquid crystal layer disposed on the polarization layer and including liquid crystal molecules;
    a lens array disposed on the liquid crystal layer and including lenses; and
    a polarization pattern disposed between the lenses and configured to polarize light in a second polarization direction that intersects the first polarization direction.

2. The display device of claim 1, wherein the first polarization direction differs from the second polarization direction by an angle of 90°.

3. The display device of claim 1, further comprising:
    a first substrate on which the liquid crystal layer is formed, and a second substrate on which the lens array is formed, wherein:
    the first substrate is rubbed in a first rubbing direction, and
    the second substrate is rubbed in a second rubbing direction that intersects the first rubbing direction.

4. The display device of claim 3, wherein:
    the first rubbing direction is substantially equal to the first polarization direction, and
    the second rubbing direction is substantially equal to the second polarization direction.

5. The display device of claim 1, wherein an alignment direction of the liquid crystal molecules is controlled according to an electric field applied to the liquid crystal molecules.

6. The display device of claim 5, wherein in a first mode:
    the liquid crystal layer is configured to rotate light incident from the polarization layer in the second polarization direction.

7. The display device of claim 5, wherein in a second mode:
    the liquid crystal layer is configured to transmit light incident from the polarization layer without any rotational change.

8. The display device of claim 1, wherein one of a major axis refractive index or a minor axis refractive index of the liquid crystal molecules is substantially equal to a refractive index of at least one of the lenses.

9. The display device of claim 1, wherein in a second mode:
    the lenses are configured to generate a light field by refracting light incident on the lenses.

10. The display device of claim 1, wherein the polarization pattern overlaps a boundary between the lenses.

11. The display device of claim 1, wherein the lenses are spaced apart from each other.

12. The display device of claim 1, wherein:
    a height of at least one of the lenses is 27 μm, and
    a height of the liquid crystal layer is 3 μm.

13. A method of manufacturing a display device, the method comprising:
    rubbing a first substrate in a first rubbing direction;
    forming a liquid crystal layer including a liquid crystal molecules on the first substrate;
    forming a lens array including lenses on a second substrate;
    forming a polarization pattern, which polarizes light in a second polarization direction intersecting a first polarization direction, between the lenses;
    rubbing the second substrate in a second rubbing direction;
    coupling the first substrate to the second substrate;
    attaching the first substrate to a polarization layer configured to polarize the light in the first polarization direction; and
    attaching the polarization layer to a display panel.

14. The method of claim 13, wherein the first polarization direction differs from the second polarization direction by an angle of 90°.

15. The method of claim 13, wherein:
    the first rubbing direction is substantially equal to the first polarization direction, and
    the second rubbing direction is substantially equal to the second polarization direction.

16. The method of claim 13, further comprising:
applying an electric field,
wherein an alignment direction of the liquid crystal molecules is controlled according to the electric field applied to the liquid crystal molecules.

17. The method of claim 13, further comprising:
forming a lower electrode on the first substrate, and
forming an upper electrode on the second substrate.

18. The method of claim 13, wherein the liquid crystal layer rotates light incident from the polarization layer in the second polarization direction in a first mode and transmits the light incident from the polarization layer without any rotational change in a second mode.

19. The method of claim 13, wherein one of a major axis refractive index or a minor axis refractive index of the liquid crystal molecules is substantially equal to a refractive index of at least one of the lenses.

20. A method of manufacturing a display device, the method comprising:
rubbing a first substrate in a first rubbing direction;
forming a lens array including lenses on a second substrate;
forming a polarization pattern, which polarizes light in a second polarization direction intersecting a first polarization direction, between the lenses;
rubbing the second substrate in a second rubbing direction;
coupling the first substrate to the second substrate;
forming a liquid crystal layer including a liquid crystal molecules between the first substrate and the second substrate;
attaching the first substrate to a polarization layer configured to polarize the light in the first polarization direction; and
attaching the polarization layer to a display panel.

21. A display device comprising:
an array of lenses;
a display panel including pixels;
a polarization pattern between the lenses; and
a liquid crystal layer between the array of lenses and the display panel, wherein the polarization pattern is configured to block light transmitted through the liquid crystal layer having a first polarization and pass light transmitted through the liquid crystal layer having a second polarization.

22. The display device of claim 21, wherein:
the light transmitted through the liquid crystal layer having the second polarization forms a two-dimensional image, and
the light transmitted through the liquid crystal layer having the first polarization forms a stereoscopic image.

23. The display device of claim 22, wherein crosstalk between adjacent ones of the lenses is reduced when the polarization pattern blocks the light transmitted through the liquid crystal layer having the first polarization.

* * * * *